United States Patent
Masuda et al.

(10) Patent No.: US 9,249,540 B2
(45) Date of Patent: Feb. 2, 2016

(54) WATER AND OIL RESISTANT AGENT FOR PAPER, TREATMENT PROCESS AND PAPER

(75) Inventors: Eiji Masuda, Settsu (JP); Michio Matsuda, Settsu (JP); Kayo Kusumi, Settsu (JP); Tetsuya Uehara, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 510 days.

(21) Appl. No.: 13/393,431

(22) PCT Filed: Aug. 31, 2010

(86) PCT No.: PCT/JP2010/065191
§ 371 (c)(1),
(2), (4) Date: Feb. 29, 2012

(87) PCT Pub. No.: WO2011/027877
PCT Pub. Date: Mar. 10, 2011

(65) Prior Publication Data
US 2012/0171495 A1      Jul. 5, 2012

Related U.S. Application Data

(60) Provisional application No. 61/238,997, filed on Sep. 1, 2009.

(51) Int. Cl.
| | | |
|---|---|---|
| *D21H 21/16* | (2006.01) | |
| *C09D 133/16* | (2006.01) | |
| *C08F 220/24* | (2006.01) | |
| *C08F 214/18* | (2006.01) | |
| *C08F 220/06* | (2006.01) | |
| *C08F 220/28* | (2006.01) | |

(52) U.S. Cl.
CPC .............. *D21H 21/16* (2013.01); *C08F 214/18* (2013.01); *C08F 220/24* (2013.01); *C09D 133/16* (2013.01); *C08F 220/06* (2013.01); *C08F 2220/281* (2013.01); *C08F 2220/286* (2013.01); *Y10T 428/3154* (2015.04)

(58) Field of Classification Search
CPC ....................................................... C09D 133/16
See application file for complete search history.

(56) References Cited

U.S. PATENT DOCUMENTS

| | | | | |
|---|---|---|---|---|
| 3,491,169 | A | | 1/1970 | Raynolds et al. |
| 5,136,000 | A | * | 8/1992 | Luttenberger et al. ........ 526/245 |
| 5,143,991 | A | * | 9/1992 | Amimoto et al. ............. 526/245 |
| 5,183,839 | A | * | 2/1993 | Aharoni ........................ 524/113 |
| 6,465,591 | B1 | * | 10/2002 | Lee ................................ 526/264 |
| 2005/0004300 | A1 | * | 1/2005 | Overbeek et al. ............. 524/502 |
| 2005/0234205 | A1 | * | 10/2005 | Yamaguchi et al. .......... 526/242 |
| 2006/0205864 | A1 | * | 9/2006 | Yamamoto et al. ........... 524/544 |
| 2008/0027170 | A1 | * | 1/2008 | Kubota ........................... 524/612 |
| 2009/0155600 | A1 | | 6/2009 | Usugaya et al. |
| 2010/0168319 | A1 | | 7/2010 | Sugimoto et al. |
| 2010/0249312 | A1 | * | 9/2010 | Jin et al. ........................ 524/505 |
| 2010/0273967 | A1 | * | 10/2010 | Takahashi et al. ............ 526/245 |

FOREIGN PATENT DOCUMENTS

| | | |
|---|---|---|
| EP | 1 942 225 A1 | 7/2008 |
| EP | 2 206 735 A1 | 7/2010 |
| WO | WO 03016412 A1 * | 2/2003 |
| WO | WO 2008022985 A1 * | 2/2008 |
| WO | WO 2009/057716 A1 | 5/2009 |

* cited by examiner

*Primary Examiner* — Nicole M Buie-Hatcher
(74) *Attorney, Agent, or Firm* — Sughrue Mion, PLLC

(57) ABSTRACT

Disclosed is a water and oil resistant agent comprising a fluorine-containing copolymer obtained by copolymerizing a (meth)acrylate monomer having a polyfluoroalkyl group having 1-6 carbon atoms, hydrophilic monomer, and monomer having an anion-donating group, which agent affords a superior water and oil resistance to a paper. The invention also discloses a process for treating a paper by the water and oil resistant agent and a treated paper thereby.

21 Claims, No Drawings

WATER AND OIL RESISTANT AGENT FOR PAPER, TREATMENT PROCESS AND PAPER

CROSS REFERENCE TO RELATED APPLICATIONS

This application is a National Stage of International Application No. PCT/JP2010/065191 filed on Aug. 31, 2010, which claims priority from U.S. Provisional Application No. 61/238,997, filed on Sep. 1, 2009, the contents of all of which are incorporated herein by reference in their entirety.

TECHNICAL FIELD

The present invention is related to a water and oil resistant agent for paper, a treatment process by the agent and the treated paper therewith.

BACKGROUND ART

The copolymer composition comprising a long chain $C_6$-$C_{12}$ polyfluoroalkyl group (hereinafter called as "Rf group") has been utilized previously as the water and oil resistant agent for paper.

On the other hand, US EPA (United State Environment Protection Agency) pointed out that the long chain Rf group produces perfluoro-octanoic acid (hereinafter called as "PFOA") which might cause an influence on the environment.

Therefore, many efforts have been made to develop a water and oil resistant agent for paper by using a fluorine-containing copolymer having a short chain Rf group. The water resistance and the oil resistance, however, tend to decrease along with the decrease of the carbon number of the Rf group, and the water and oil resistance is not satisfactory. So, further improvements have to be made to provide a paper having an enough water and oil resistance.

Sugimoto et. al. (WO2009/057716), for example, proposed the water and oil resistant agent for paper comprising a fluorine-containing copolymer which contains, as essential polymer units, a fluorine-containing (meth)acrylate monomer having a $C_1$-$C_6$ Rf group, a polyalkylene glycol (meth) acrylate monomer and itaconic acid. The water and oil resistance of this agent has been improved fairy well. A further improvement, however, is still required to attain usual properties of the copolymer having a long chain Rf group.

DISCLOSURE OF INVENTION

We, the inventors, surprisingly discovered that a paper-treatment agent comprising, as an essential component, a fluorine-containing copolymer having a short chain Rf, specified polymer units and a high molecular weight can exhibit a superior water and oil resistance. Thus, the present invention has been completed.

That is, the subject of the invention is related to a water and oil resistant agent for paper comprising a fluorine-containing copolymer comprising the repeating units derived from:
(a) a fluorine-containing monomer having a fluoroalkyl group represented by the general formula:

$$CH_2=C(-X)-C(=O)-Y-Z-Rf \qquad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$-$C_{21}$ fluoroalkyl group, a substituted or non-substituted benzyl group, or a substituted or non-substituted phenyl group;

Y is —O— or —NH—;

Z is a $C_1$-$C_{10}$ aliphatic group, a $C_6$-$C_{10}$ aromatic or cyclic aliphatic group, a —$CH_2CH_2N(R^1)SO_2$— group wherein $R^1$ is a $C_1$-$C_4$ alkyl group, a —$CH_2CH(OZ^1)CH_2$— group wherein $Z^1$ is a hydrogen atom or an acetyl group, a —$(CH_2)_m$—$SO_2$—$(CH_2)_n$— group or a —$(CH_2)_m$—$S$—$(CH_2)_n$— group wherein m is 1-10 and n is 0-10, and Rf is a $C_1$-$C_6$ linear or branched fluoroalkyl group, (b) a hydrophilic monomer, and (c) a monomer having an anion-donating group, wherein a weight average molecular weight of the fluorine-containing copolymer is 100,000 or more. The weight average molecular weight is determined by the gel permeation chromatography measurement in terms of a molecular weight of polymethyl methacrylate.

The subject of the present invention is related to a process for treating a paper with the above-described water and oil resistant agent, and it is also related to a water and oil resistant paper obtained thereby.

EFFECT OF THE INVENTION

The present invention provides the water and oil resistant agent comprising a fluorine-containing copolymer, which agent affords the superior water and oil resistance to the paper. The present invention provides the process for the paper treatment by the water and oil resistant agent and the water and oil resistive paper obtained by utilizing the water and oil resistant agent.

MODE FOR CARRYING OUT THE INVENTION

In the present invention, the composition of the fluorine-containing copolymer has a great influence on the water and oil resistance of the water and oil resistant agent. The fluorine-containing copolymer used in the present invention is explained as follows. The fluorine-containing monomer (a) may be substituted by a halogen atom etc. at its α-position. Therefore, X in the formula (1) may be a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ area hydrogen atom, a fluorine atom, a chlorine atom, a bromine atom or an iodine atom, a cyano group, a linear or branched $C_1$-$C_{21}$ fluoroalkyl group, a substituted or non-substituted benzyl group, or a substituted or non-substituted phenyl group.

In the formula (1), the Rf group is preferably a perfluoroalkyl group. The carbon number of the Rf group may be 1-6, especially 4-6, and typically 6. The examples of the Rf group are —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$ and —$(CF_2)_3CF(CF_3)_2$ etc. Especially, —$(CF_2)_5CF_3$ is preferable.

Non-limiting examples of the fluorine-containing monomer (a) are exemplified as follows:

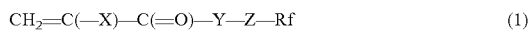
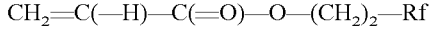
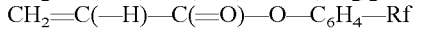
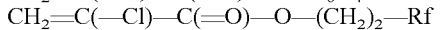
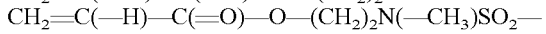

CH₂=C(—H)—C(=O)—O—(CH₂)₂N(—C₂H₅)SO₂—Rf
CH₂=C(—H)—C(=O)—O—CH₂CH(—OH)CH₂—Rf
CH₂=C(—H)—C(=O)—O—CH₂CH(—OCOCH₃)CH₂—Rf
CH₂=C(—H)—C(=O)—O—(CH₂)₂—S—Rf
CH₂=C(—H)—C(=O)—O—(CH₂)₂—S—(CH₂)₂—Rf
CH₂=C(—H)—C(=O)—O—(CH₂)₃—SO₂—Rf
CH₂=C(—H)—C(=O)—O—(CH₂)₂—SO₂—(CH₂)₂—Rf
CH₂=C(—H)—C(=O)—NH—(CH₂)₂—Rf
CH₂=C(—CH₃)—C(=O)—O—(CH₂)₂—S—Rf
CH₂=C(—CH₃)—C(=O)—O—(CH₂)₂—S—(CH₂)₂—Rf
CH₂=C(—CH₃)—C(=O)—O—(CH₂)₃—SO₂—Rf
CH₂=C(—CH₃)—C(=O)—O—(CH₂)₂—SO₂—(CH₂)₂—Rf
CH₂=C(—CH₃)—C(=O)—NH—(CH₂)₂—Rf
CH₂=C(—F)—C(=O)—O—(CH₂)₂—S—Rf
CH₂=C(—F)—C(=O)—O—(CH₂)₂—S—(CH₂)₂—Rf
CH₂=C(—F)—C(=O)—O—(CH₂)₂—SO₂—Rf
CH₂=C(—F)—C(=O)—O—(CH₂)₂—SO₂—(CH₂)₂—Rf
CH₂=C(—F)—C(=O)—NH—(CH₂)₂—Rf
CH₂=C(—Cl)—C(=O)—O—(CH₂)₂—S—Rf
CH₂=C(—Cl)—C(=O)—O—(CH₂)₂—S—(CH₂)₂—Rf
CH₂=C(—Cl)—C(=O)—O—(CH₂)₂—SO₂—Rf
CH₂=C(—Cl)—C(=O)—O—(CH₂)₂—SO₂—(CH₂)₂—Rf
CH₂=C(—Cl)—C(=O)—NH—(CH₂)₂—Rf
CH₂=C(—CF₃)—C(=O)—O—(CH₂)₂—S—Rf
CH₂=C(—CF₃)—C(=O)—O—(CH₂)₂—S—(CH₂)₂—Rf
CH₂=C(—CF₃)—C(=O)—O—(CH₂)₂—SO₂—Rf
CH₂=C(—CF₃)—C(=O)—O—(CH₂)₂—SO₂—(CH₂)₂—Rf
CH₂=C(—CF₃)—C(=O)—NH—(CH₂)₂—Rf
CH₂=C(—CF₂H)—C(=O)—O—(CH₂)₂—S—Rf
CH₂=C(—CF₂H)—C(=O)—O—(CH₂)₂—S—(CH₂)₂—Rf
CH₂=C(—CF₂H)—C(=O)—O—(CH₂)₂—SO₂—Rf
CH₂=C(—CF₂H)—C(=O)—O—(CH₂)₂—SO₂—(CH₂)₂—Rf
CH₂=C(—CF₂H)—C(=O)—NH—(CH₂)₂—Rf
CH₂=C(—CN)—C(=O)—O—(CH₂)₂—S—Rf
CH₂=C(—CN)—C(=O)—O—(CH₂)₂—S—(CH₂)₂—Rf
CH₂=C(—CN)—C(=O)—O—(CH₂)₂—SO₂—Rf
CH₂=C(—CN)—C(=O)—O—(CH₂)₂—SO₂—(CH₂)₂—Rf
CH₂=C(—CN)—C(=O)—NH—(CH₂)₂—Rf
CH₂=C(—CF₂CF₃)—C(=O)—O—(CH₂)₂—S—Rf
CH₂=C(—CF₂CF₃)—C(=O)—O—(CH₂)₂—S—(CH₂)₂—Rf
CH₂=C(—CF₂CF₃)—C(=O)—O—(CH₂)₂—SO₂—Rf
CH₂=C(—CF₂CF₃)—C(=O)—O—(CH₂)₂—SO₂—(CH₂)₂—Rf
CH₂=C(—CF₂CF₃)—C(=O)—NH—(CH₂)₂—Rf
CH₂=C(—F)—C(=O)—O—(CH₂)₃—S—Rf
CH₂=C(—F)—C(=O)—O—(CH₂)₃—S—(CH₂)₂—Rf
CH₂=C(—F)—C(=O)—O—(CH₂)₃—SO₂—Rf
CH₂=C(—F)—C(=O)—O—(CH₂)₃—SO₂—(CH₂)₂—Rf
CH₂=C(—F)—C(=O)—NH—(CH₂)₃—Rf
CH₂=C(—Cl)—C(=O)—O—(CH₂)₃—S—Rf
CH₂=C(—Cl)—C(=O)—O—(CH₂)₃—S—(CH₂)₂—Rf
CH₂=C(—Cl)—C(=O)—O—(CH₂)₃—SO₂—Rf
CH₂=C(—Cl)—C(=O)—O—(CH₂)₃—SO₂—(CH₂)₂—Rf
CH₂=C(—CF₃)—C(=O)—O—(CH₂)₃—S—Rf
CH₂=C(—CF₃)—C(=O)—O—(CH₂)₃—S—(CH₂)₂—Rf
CH₂=C(—CF₃)—C(=O)—O—(CH₂)₃—SO₂—Rf
CH₂=C(—CF₃)—C(=O)—O—(CH₂)₃—SO₂—(CH₂)₂—Rf
CH₂=C(—CF₂H)—C(=O)—O—(CH₂)₃—S—Rf
CH₂=C(—CF₂H)—C(=O)—O—(CH₂)₃—S—(CH₂)₂—Rf
CH₂=C(—CF₂H)—C(=O)—O—(CH₂)₃—SO₂—Rf
CH₂=C(—CF₂H)—C(=O)—O—(CH₂)₃—SO₂—(CH₂)₂—Rf
CH₂=C(—CN)—C(=O)—O—(CH₂)₃—S—Rf
CH₂=C(—CN)—C(=O)—O—(CH₂)₃—S—(CH₂)₂—Rf
CH₂=C(—CN)—C(=O)—O—(CH₂)₃—SO₂—Rf
CH₂=C(—CN)—C(=O)—O—(CH₂)₃—SO₂—(CH₂)₂—Rf
CH₂=C(—CF₂CF₃)—C(=O)—O—(CH₂)₃—S—Rf
CH₂=C(—CF₂CF₃)—C(=O)—O—(CH₂)₃—S—(CH₂)₂—Rf
CH₂=C(—CF₂CF₃)—C(=O)—O—(CH₂)₃—SO₂—Rf
CH₂=C(—CF₂CF₃)—C(=O)—O—(CH₂)₂—SO₂—(CH₂)₂—Rf wherein Rf is a fluoroalkyl group of $C_1$-$C_6$, preferably $C_4$-$C_6$.

The fluoroalkyl group (Rf) in the fluorine-containing monomer (a) may be, preferably a perfluoroalkyl group, and most preferably a $C_4$-$C_6$ perfluoroalkyl group.

The fluorine-containing monomer (a) may be a mixture of two or more types of monomers. The amount of the fluorine-containing monomer (a) may be 40-90 wt %, more preferably 45-85 wt %, most preferably 60-85 wt % based on the fluorine-containing copolymer.

The hydrophilic monomer (b) is at least one oxyalkylene (meth)acrylate, preferably represented by the general formulas:

$$CH_2=CX^1C(=O)—O—(RO)_n—X^2 \quad (2a)$$

and $$CH_2=CX^1C(=O)—O—(RO)_n—C(=O)CX^1=CH_2 \quad (2b)$$

wherein $X^1$ is a hydrogen atom or a methyl group;
$X^2$ is a hydrogen atom or a saturated or unsaturated $C_1$-$C_{22}$ hydrocarbon group;
R is a $C_2$-$C_6$ alkylene group; and
n is an integer of 1-90,
wherein polyoxyalkylene (meth)acrylate and/or 2-hydroxyethyl(meth)acrylate are exemplified.

The oxyalkylene group is preferably C2-C6, more preferably C2-C4. The average polymerization degree of oxyalylene groups in the polyoxyalkylene group may be 2 to 20, preferably 2 to 10.

The following compounds are exemplified as the oxyalkylene (meth)acrylate: CH₂=CH—C(=O)—O—CH₂CH₂OH, CH₂=C(CH₃)—C(=O)—O—CH₂CH₂OH, CH₂=CH—C(=O)—O—(CH₂CH₂O)₂H, CH₂=CH—C(=O)—O—(CH₂CH₂O)₃H, CH₂=CH—C(=O)—O—(CH₂CH₂O)₁₁H, CH₂=CH—C(=O)—O—(CH₂CH₂O)₁₂H, CH₂=C(CH₃)—C(=O)—O—(CH₂CH₂O)₂H, CH₂=C(CH₃)—C(=O)—O—(CH₂CH₂O)₃H, CH₂=C(CH₃)—C (=O)—O—(CH$_2$CH$_2$O)$_{11}$H, CH$_2$=C(CH$_3$)—C(=O)—O—(CH$_2$CH$_2$O)$_{12}$H, CH$_2$=CH—C(=O)—O—(CH$_2$)$_2$—OCH$_3$, CH$_2$=CH—C(=O)—O—(CH$_2$)$_2$—OCH$_2$CH$_3$, CH$_2$=C(CH$_3$)—C(=O)—O—(CH$_2$)$_2$—OCH$_3$, CH$_2$=C(CH$_3$)—C(=O)—O—(CH$_2$)$_2$—OCH$_2$CH$_3$, CH$_2$=CH—C(=O)—O—(CH$_2$CH$_2$O)C(=O)—CH=CH$_2$, CH$_2$=CH—C(=O)—O—(CH$_2$CH$_2$O)$_2$C(=O)—CH=CH$_2$, CH$_2$=C(CH$_3$)—C(=O)—O—(CH$_2$CH$_2$O)C(=O)—CH=CH$_2$, CH$_2$=C(CH$_3$)—C(=O)—O—(CH$_2$CH$_2$O)$_2$C(=O)—CH=CH$_2$.

The oxyalkylene (meth)acrylate may be preferably (b1) ω-hydroxy-polyoxyalkylene (meth)acrylate and/or (b2) 2-hydroxyethyl(meth)acrylate.

The monomer (c) is a compound having an anion-donating group and a carbon-carbon double bond. The anion-donating group may be a carboxyl group or a sulfonic acid group. The monomer (c) may be preferably at least one selected from the group consisting of (meth)acrylic acid, crotonic acid, maleic acid, fumaric acid, itaconic acid, citraconic acid, vinylsulfonic acid, (meth)allylsulfonic acid, styrene sulfonic acid, vinylbenzene sulfonic acid, acrylamide-tert-butylsulfonic acid, and salts thereof. The especially preferable monomer (c) is (meth)acrylic acid.

In the fluorine-containing copolymer, the amount of the monomer (a) may be 40-90 wt %, preferably 60-85 wt %, the amount of the monomer (b) may be 2-50 wt %, preferably 5-35 wt %, and the amount of the monomer (c) may be 0.1-30 wt %, preferably 1-15 wt %. The hydrophilic monomer (b) preferably comprises (b1) ω-hydroxy-polyoxyethylene (meth)acrylate and/or (b2) 2-hydroxyethyl(meth)acrylate, and the wt % range of the monomer (b) is equal to the sum amount of (b1) and (b2). That is, the ratio in wt % among monomers (a), (b1), (b2) and (c) may be preferably in the range of (a):(b1):(b2):(c)=60-85:1-15:5-20:1-15.

In the present invention, both the composition of the fluorine-containing copolymer and the molecular weight of the fluorine-containing copolymer greatly influence the water and oil resistance. The weight average molecular weight of the fluorine-containing copolymer of the present invention is 100,000 or more, preferably, 100,000 to 3,000,000, and further preferably 120,000 to 2,000,000. When the molecular weight is in these ranges, satisfactory water and oil resistance and viscosity properties are obtained.

The preferable embodiments of the fluorine-containing copolymer of the present invention are described below:

The first preferable embodiment of the monomer composition for the fluorine-containing copolymer comprises at least one fluorine-containing monomer (a) wherein Rf represents a perfluoroalkyl group having 4-6 carbon atoms,
the hydrophilic monomer (b) containing at least one of ω-hydroxy-polyoxyalkylene (meth)acrylate (b1) and/or 2-hydroxyethyl(meth)acrylate (b2) and
the anion donating group-containing monomer (c) selected from the group consisting of (meth)acrylic acid, crotonic acid, maleic acid, fumaric acid, itaconic acid and citraconic acid.

Specifically is exemplified the embodiment wherein the fluorine-containing monomer (a) is F(CF$_2$)$_4$CH$_2$CH$_2$OCOCH=CH$_2$, F(CF$_2$)$_6$CH$_2$CH$_2$OCOCH=CH$_2$ or a mixture thereof, the hydrophilic monomer (b) is ω-hydroxy-polyoxyalkylene (meth)acrylate (b1) and/or 2-hydroxyethyl (meth)acrylate (b2), and the anion donating group-containing monomer (c) is (meth)acrylic acid.

Further specifically is exemplified the embodiment wherein the fluorine-containing monomer (a) is F(CF$_2$)$_4$CH$_2$CH$_2$OCOCH=CH$_2$, F(CF$_2$)$_6$CH$_2$CH$_2$OCOCH=CH$_2$ or a mixture thereof, the hydrophilic monomer (b) is ω-hydroxy-polyoxyethylene(meth)acrylate (b1) (the average polymerization degree of polyoxyethylene is 2 to 10) and/or 2-hydroxyethyl(meth)acrylate (b2), and the anion donating group containing monomer (c) is (meth)acrylic acid, the weight ratio of (a):(b):(c) is 60-85:5-35:1-15, and the weight average molecular weight of the obtained fluorine-containing polymer is 120,000 to 2,000,000.

The present invention also relates to a process for a water and oil resistant treatment of a paper, which process comprises a step of applying the water and oil resistant agent of the present invention to the surface of the paper. This treatment process is hereinafter called as "surface application process". In this process, it is preferable to apply the water and oil resistant agent comprising a fluorine-containing copolymer in such amount that the weight ratio of the fluorine atoms to the paper is 0.005 to 0.6 wt %.

The present invention also relates to a process for a water and oil resistant treatment of a paper, which process comprises a step of applying the water and oil resistant agent of the present invention to the whole of the paper including its internal parts. This treatment process is hereinafter called as "internal application process". In this process, the water and oil resistant agent of the present invention comprising a fluorine-containing copolymer is applied in the papermaking step from pulp. Specifically, it is preferable to apply the water and oil resistant agent in such amount that the weight ratio of the fluorine atoms to the paper is 0.01 to 1.0 wt %.

The present invention also relates to a water and oil resistant paper treated by the water and oil resistant agent of the present invention.

The present invention also relates to a paper obtained by the surface application process and the internal application process.

The production of the fluorine-containing copolymer of the present invention can be carried out by polymerizing monomers (a), (b) (or (b1) and/or (b2)) and (c) in a liquid medium. The liquid medium is preferably water soluble or water dispersible solvent. The liquid medium may be a mixture comprising the water soluble or water dispersible solvent. The monomer and the liquid medium preferably are in a form of a solution wherein the monomer is dissolved in the liquid medium. The polymerization may be a solution polymerization or an emulsion polymerization, preferably a solution polymerization in view of stability of polymerization reaction.

In this invention, the monomer (c) (an anion donating group) may be neutralized with a base (such as an aqueous solution of inorganic or organic base) after conducting the copolymerization; or the copolymerization may be carried out using the monomer (c) neutralized with the base in advance. When the monomers are polymerized after the monomer (c) is neutralized with the base in advance, the neutralization with a basic aqueous solution after copolymerization is not necessary.

As the inorganic or organic bases, the followings are exemplified:
sodium hydroxide, potassium hydroxide, ammonia, triethylamine, tri-n-propylamine, triisopropylamine, tri-n-butylamine, tri-sec-butylamine, ethanolamine, diethanolamine, triethanolamine, 2-amino-2-methyl-1-propanol, 2-aminoethyl-1,3-propanediol, 2-amino-2-hydroxymethyl-1,3-propanediol, bis(hydroxymethyl)methylaminomethane, tris(hydroxymethyl)aminomethane, lysine, and arginine, etc. Among these bases, sodium hydroxide, potassium hydroxide, ammonia, triethylamine, diethanolamine and triethenolamine etc. are preferable from the view point of the improvement of the dispersing stability of the obtained fluorine-containing copolymer in the aqueous medium.

The polymer mixture after copolymerization may be, if necessary, diluted by adding the liquid medium (for example, water or an aqueous solution containing inorganic or organic bases).

As non-limiting examples of the water-soluble or water-dispersible organic solvents utilized in copolymerization, the followings are exemplified: ketones (for example, acetone or methyl ethyl ketone), alcohols (for example, methanol, ethanol and isopropanol), ethers (for example, methyl or ethyl ether of ethylene glycol or propylene glycol, acetate ester thereof, tetrahydrofuran and dioxane), acetonitrile, dimethylformamide, N-methyl-2-pyrollidone, butyllactone and dimethylsulfoxide, etc. Among them, methyl ethyl ketone (MEK), N-methyl-2-pyrollidone (NMP), a mixture of N-methyl-2-pyrollidone and acetone, isopropanol or methanol is preferable as a solvent. The total monomer concentration in the solution may be in the range of 20-70 wt %, preferably, 40-60 wt %.

The copolymerization may be carried out using at least one initiator in the range of 0.1-3.0 wt % based on the total weight of the monomers. The following initiators may be used: peroxides such as benzoyl peroxide, lauroyl peroxide, succinyl peroxide and ter-butyl peroxypivalate, or azo-compounds such as 2,2-azobis-isobutylonitrile, 4,4-azobis(4-cyanopentanoic acid) and azodicarbonamide.

A chain transfer agent may be used for controlling the molecular weight of the copolymer. As the chain transfer agent, alkylmercaptan (dodecylmercaptan, laurylmercaptan, stearylmercaptan, etc.), aminoethanethiol, mercaptoethanol, thioglycollic acid, and 2-mercaptopropionic acid etc. are preferably exemplified. The amount of the chain transfer agent used may be in a range of 0.05-1 parts by weight based on 100 parts by weight of the total monomers in the copolymerization.

The copolymerization can be carried out in the range between 40° C. and the boiling point of the reaction mixture. The dilution step may be carried out by adding a liquid medium, for example, water or an aqueous solution of a strong or moderate inorganic or organic base into the organic solution of fluorine-containing copolymer in organic solvent. The above described bases are exemplified as such a base usable for the dilution step. Among them, sodium hydroxide and ammonia are preferably used. The amount of the aqueous solution and the concentration of the base are preferable to be sufficiently enough firstly to neutralize the carboxylic acid group or the sulfonic acid group, and secondly to attain the solid concentration of the fluorine-containing copolymer of 5-35 wt %, preferably 15-25 wt % in the final copolymer solution. In order to neutralize the carboxylic acid group and the sulfonic acid group, it is advantageous to make the amount of base in the range of 0.1-5 eq., preferably 0.5-3 eq. based on the monomer (c).

The paper to which the water and oil resistant agent comprising the fluorine-containing copolymer of the present invention is to be applied can be produced by the conventional paper making method. Both the internal application process and the surface application process may be used. In the internal application process, the treating agent is added to the pulp slurry before paper making, and in the surface application process, the treating agent is added to the paper after paper making.

In case of applying the water and oil resistant agent of the present invention to the surface of the paper (surface application process), it is preferable to use the water and oil resistant agent in such amount that the weight ratio of the fluorine atoms is in the range of 0.005-0.6 wt %, preferably 0.01-0.4 wt % based on the weight of the paper. On the other hand, in case of applying the water and oil resistant agent to the whole paper including its internal parts, it is preferable to use the water and oil resistant agent in such amount that the weight ratio of the fluorine atoms is in the range of 0.01-1.0 wt %, especially, 0.02-0.6 wt % based on the weight of the pulp.

The paper substrate thus treated exhibits a superior oil and water resistance after heat treatment at room temperature or at high temperature, or if necessary depending on the nature of the paper substrate, by accompanying a heat treatment which can be at a higher temperature of at most 300° C., for example, at most 200° C.

The paper substrate treated by the process of the present invention is exemplified as follows: a raw paper for plaster board, a coated raw paper, a wood-containing paper, a general liner and a flute, a neutral white role paper, a neutral liner, an anti-corrosion liner, a paper combined with metal and a kraft paper, etc. The following paper substrate are further exemplified: a neutral paper for printing and writing, a neutral coated raw paper, a neutral paper for PPC, a neutral heat-sensitive paper, a neutral pressure-sensitive paper, a neutral paper for ink-jet, and a neutral paper for information industry. Other papers such as a mold paper formed by molding, especially, a molded paper vessel, are exemplified. A pulp-molded vessel can be produced by the process described in the JP9-183429A.

The following materials can be utilized as a starting pulp materials for paper: a bleached or unbleached chemical pulp such as a kraft pulp or a sulfite pulp, a bleached or unbleached high-yield pulp such as a grand pulp, a mechanical pulp or a thermo-mechanical pulp, and a waste pulp such as a waste paper of newspaper, magazine, cardboard or deinked paper, etc. The mixtures may be also utilized between the pulp materials above mentioned and any one of synthetic fibers such as polyamide, polyimide, polyester, polyolefin and polyvinylalcohol, etc.

When the surface application process and the internal application process are applied, a size agent, in addition to the water and oil resistant agent, can be added optionally to improve the water resistance of the paper. The examples of the size agent are a cationic size agent, an anionic size agent and a rosin size agent (for example, an acidic rosin size agent, a neutral rosin size agent). Among them, a styrene-acrylic acid copolymer, alkenylsuccinic anhydride and an alkylketene dimer are preferable. The amount of the size agent may be 0.001-5 wt % based on the amount of the pulp.

If necessary, other agents generally added to the paper-treatment agent may be used: a paper strengthening agent such as starch, various modified starch, carboxymethyl-cellulose, polyamidepolyamine-epichlorohydrin (PEA), polydiallyldimethylammonium chloride (poly-DADMAC) and polyamide etc., a retention aid, a dyestuff, a fluorescent dyestuff, a filler, a pigment, a slime-controlling agent, an anti-slipping agent, a deformer, etc. In the surface application process, the paper-treatment agents can be applied to the paper by means of a size press, coating (a gate roll coater, a bill blade coater and a bar coater, etc.).

The followings are examples which specifically explain the present invention. These examples are for the explanation of the present invention, but do not limit the present invention. The terms "parts" and "%" read, if not specified, "parts by weight" and "weight %", respectively.

The testing methods used in the examples are described as follows:

"Viscosity"

A viscosity of a solution was measured using a rotary viscometer at a controlled solution temperature of 25° C.

"Stability Test"

The stability of the dispersion of fluorine-containing copolymer in water (aqueous dispersion) was observed as follows: An aqueous dispersion having a solid content being adjusted to 20 wt % was left standing for seven days at room temperature in 110 ml clear glass sample pot, and its dispersion state was visually observed by eyes whether a sedimentation or a coagulation occurred or not. The evaluation was summarized as follows: "Good" stands for absence of sedimentation or coagulation; "Fair" stands for fractional sedimentation or aggregation; "Poor" stands for large sedimentation or coagulation.

"Water Resistance Test: Cobb Test (JIS P8140)"

The test consists of measuring the weight (g) of the water absorbed in one minute by the paper having 1 m² area and supporting 1 cm height of water.

"Oil Resistance Test (Kit Test)"

The oil resistance was measured according to the TAPPI T-559 cm-02 method. A drop of the test oil shown in Table 1 was placed on the paper, then, the infiltration state of the oil was observed after 15 seconds. The maximum point of an oil resistance given by the oil having no infiltration was assigned to be an oil resistance of the paper.

TABLE 1

| Degree of oil resistance | Caster oil | Toluene | n-Heptane |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

"AGR (Aggressive-Grease Resistance) Test"

This test is particularly useful to verify the anti-grease paper suitability for the pet-food packaging. Briefly, this test implies the contact in standardized conditions of the pet-food with the paper specimen to be tested. The pet-food with the trademark Science diet (produced by Hill's corp.) was used as the pet-food for testing. The pet-food is finely milled in a mixer. An anti-grease paper specimen, having 10×10 cm sizes, is cut out to be tested, and placed over a coated paper sheet on which a grid of 100 small squares is printed, having a surface exactly equal to that of specimen to be tested. Before fitting the position on the grid, the specimen is slightly creased. First of all, the specimen is folded back along the line connecting the centers of the facing two edges, and the crease is reinforced by a proper roll (weight: 2450+110 g; diameter: 8 cm; width: 7 cm) covered with a rubber layer with 0.6 cm thickness and having a controlled hardness. The roll speed is 50-60 cm/sec. during the creasing. The first crease is formed along the line connecting the centers of the facing two edges, and the second crease is formed on the opposite side of the paper. The creased specimen is placed on the grid to cover the grid surface completely. A metal ring having an internal diameter equal to 7.2 cm and height equal to 2.5 cm is placed in the middle of the specimen. Then 36 g of milled pet-food are taken, which are homogeneously paced inside the ring on the paper specimen to be tested. A weight equal to 1.5 kg, cylinder-shaped, having lower surface smooth as that of the ring, is then placed on the milled pet-food applied to the paper specimen. The whole is put in a stove at 60° C. and 50% humidity for 24 hours. This time elapsed, the weight and the pet-food are removed and the specimen surface is tested to find fat stains, which would witness the occurred fat penetration. The test result is expressed in terms of percentage of stained surface. To have a significant result, the test is carried out on at least 4 specimens subjected to the same treatment and the final result is the average of the 4 tests.

Synthesis Example 1

Hundred (100) parts by weight of methyl ethyl ketone (MEK) as a solvent was introduced into a 500 ml reaction vessel equipped with a stirrer, a thermometer, a refluxing condenser, a dropping funnel, a nitrogen gas inlet and a heater. Then, under stirring, a monomer consisting of 77 parts of $F(CF_2)_6CH_2CH_2OCOCH=CH_2$ (hereinafter called as "C6FA"), 13 parts of 2-hydroxyethyl methacrylate (HEMA), 5 parts of ω-hydroxy-polyoxyethyleneacrylate (BLEM-MER$^R$ AE-200 produced by NOF: the average degree of polymerization of the polyoxyethylene group=4.5) and 5 parts of methacrylic acid (MAA) (the total amount of monomer is 100 parts), and an initiator, 4,4'-azobis(4-cyanopentanoic acid) (0.5 parts) were added in these sequences to obtain a mixture, which was further stirred for 12 hrs. under the nitrogen atmosphere at 70° C. to complete the copolymerization, thereby giving a solution (S1). The solid concentration of the obtained solution containing the copolymer (S1) was 50 wt %. The molecular weight of the obtained fluorine-containing copolymer was measured by the gel permeation chromatography, and the weight average molecular weight was 500,000 in terms of the molecular weight of polymethyl methacrylate.

Synthesis Example 2

The copolymerization was carried out by following the same procedure as Synthesis Example 1 except that laurylmercaptane (L-SH) in 0.1 parts was additionally charged as the chain transfer agent and the initiator was replaced by tert-butyl peroxypivalate in 0.5 parts, to give a solution (S2) containing the copolymer. The solid content of the solution (S2) was 50 wt %. The weight average molecular weight was 150,000 in terms of the molecular weight of polymethyl methacrylate.

Synthesis Example 3

The copolymerization was carried out by following the same procedure as Synthesis Example 1 except that the amount of $F(CF_2)_6CH_2CH_2OCOCH=CH_2$ (C6FA) was 74 parts, the amount of 2-hydroxyethyl methacrylate (HEMA) was 16 parts, and the initiator was replaced by tert-butyl perpivalate in 0.5 parts, to give a solution (S3) containing the copolymer. The solid content of the solution (S3) was 50 wt %. The weight average molecular weight was 500,000 in terms of the molecular weight of polymethyl methacrylate.

Synthesis Example 4

The copolymerization was carried out by following the same procedure as Synthesis Example 1 except that itaconic acid (IA) was used in 5 parts instead of methacrylic acid (MAA). The solid content of the solution (S4) obtained was 50 wt %. The weight average molecular weight was 180,000 in terms of the molecular weight of polymethyl methacrylate.

Comparative Synthesis Example 1

The copolymerization was carried out by following the same procedure as Synthesis Example 1 except that laurylmercaptane (L-SH) in 0.3 parts was additionally charged as the chain transfer agent. The obtained solid content of the solution (R1) containing the copolymer was 50 wt %. The weight average molecular weight was 50,000 in terms of the molecular weight of polymethyl methacrylate.

Comparative Synthesis Example 2

The copolymerization was carried out by following the same procedure as Synthesis Example 1 except that laurylmercaptane (L-SH) in 1.0 part was additionally charged as a chain transfer agent. The obtained solid content of the solution (R2) containing the copolymer was 50 wt %. The weight average molecular weight was 10,000 in terms of the molecular weight of polymethyl methacrylate.

Comparative Synthesis Example 3

The copolymerization was carried out following the same procedure as Synthesis Example 2 except that itaconic acid (IA) was used in 5 parts instead of methacrylic acid (MAA). The obtained solid content of the solution (R3) containing the copolymer was 50 wt %. The weight average molecular weight was 45,000 in terms of the molecular weight of polymethyl methacrylate.

The results of the viscosity measurement of the solutions obtained in Synthesis Examples 1-4 and in Comparative Synthetic Examples 1-3 are shown in Table 2.

TABLE 2

| | Solution | | | | | | |
|---|---|---|---|---|---|---|---|
| | S1 | S2 | S3 | S4 | R1 | R2 | R3 |
| Viscosity (cps) | 5000 | 2500 | 3900 | 3000 | 800 | 150 | 680 |

Preparation Example 1

A pale yellow aqueous dispersion containing fluorine-containing copolymer (the content of the volatile organic solvent being less than 1 wt %) was obtained by the following sequential procedures: Adding 1.2 g of an aqueous 23% ammonia solution and 90 g of an ion-exchanged water to the solution (S1) containing the fluorine-containing copolymer obtained in Synthesis Example 1, preparation of an emulsified dispersion and evaporating MEK under reduced pressure by heating. To this aqueous dispersion is further added the ion-exchanged water to obtain an aqueous dispersion (SD1) having a solid content of 20 wt %.

The dispersion stability of the SD1 obtained was evaluated in the above described method, and the obtained results are shown in Table 3.

Preparation Examples 2 and 3

As to the solutions (S2 and S3) obtained in Synthesis Examples 2 and 3, the same procedures as Preparation Example 1 were carried out except that 6.0 g of an aqueous 10 wt % sodium hydroxide solution as a base and 85 g of ion-exchange water were used, to give an aqueous dispersions (SD2 and SD3) having a solid content of 20 wt %. The dispersion stability of the SD2 and SD3 were measured, and the obtained results are shown in Table 3.

Preparation Example 4

As to the solution (S4) obtained in Synthesis Example 4, the same procedure as Preparation Example 1 was carried out except that 1.3 g of diethanolamine as a base was used, to give an aqueous dispersions (SD4) having a solid content of 20 wt %. The dispersion stability of the SD4 was measured, and the obtained results are shown in Table 3.

Comparative Preparation Examples 1 and 2

As to the solutions (R1 and R2) obtained in Comparative Synthesis Examples 1 and 2, the same procedures as Preparation Example 1 were carried out, to give an aqueous dispersions (RD1 and RD2) having a solid content of 20 wt %. The dispersion stabilities of the RD1 and RD2 were measured, and the obtained results are shown in Table 3.

Comparative Preparation Example 3

As to the solution (R3) obtained in Comparative Synthesis Example 3, the same procedure as Preparation Example 1 was carried out except that 1.3 g of diethanolamine was used as the base, to give an aqueous dispersion (RD3) having a solid content of 20 wt %. The dispersion stability of the RD3 was measured, and the obtained results are shown in Table 3.

Example 1

Evaluation in the Surface Application Process

Preparation of a Paper to be Tested

A paper to be tested was produced by using a test paper machine installed in the Western Michigan University in U.S.A. The production process is shown below. The types of pulp used were LBKP (Leaf Bleached Kraft Pulp) and NBKP (Needle Bleached Kraft Pulp), and their ratio was 6/4 (L/N) and the freeness of the pulp was 400 ml (Canadian Standard Freeness).

In slurry of the pulp having a concentration of about 2%, a cationic starch Stayloc 400 (produced by Tate and Lyle) was added in 2 wt % based on the dried pulp weight, and further a size agent Hercon 70 (produced by Hercules corp.) was added in 0.0375 wt % based on the dried pulp weight. A paper was produced from the pulp slurry by using a fourdrinire machine. The basis weight of the paper obtained was 60 g/cm$^2$ and the thickness was 0.01 mm. The water resistance (Cobb value) was 80 g/cm$^2$, and the oil resistance (Kit value) was 0.

The water and oil resistant paper (treated paper) was produced in following to the procedure described below using, as an water and oil resistant agent, the aqueous dispersion solution (SD1) containing the fluorine-containing copolymer obtained in Preparation Example 1

The aqueous dispersion solution (SD1) containing the fluorine-containing copolymer obtained in Preparation Example 1 was diluted to adjust the solid content to 0.2 wt % to give the water and oil resistant composition.

The paper prepared above was dipped in the water and oil resistant composition for 5 minutes and dried at 115° C. for 70 seconds to obtain a raw paper for test.

Using the raw paper obtained above as the testing paper, the Kit Test and the Cobb Test mentioned above were carried out. The obtained results are shown in Table 3.

Examples 2-4

Evaluation in the Surface Application Process

Using, as water and oil resistant agents, the aqueous dispersion solutions (SD2-SD4) containing the fluorine-containing copolymer obtained in Preparation Examples 2-4, the water and oil resistant compositions were obtained by diluting the aqueous dispersion solutions (SD2-SD4) to adjust the solid content to 0.2 wt %. Using each composition, the Kit Test and the Cobb Test were carried out in the same way as Example 1. The obtained results are shown in Table 3.

Comparative Examples 1-3

Evaluation in the Surface Application Process

Using, as water and oil resistant agents, the aqueous dispersion solutions (RD1-RD3) containing the fluorine-containing copolymer obtained in Comparative Preparation Examples 1-3, the water and oil resistant compositions were obtained by diluting the aqueous dispersion solutions (RD1-RD3) to adjust the solid content to 0.2 wt %. Using each composition, the Kit Test and the Cobb Test were carried out in the same way as the Example 1. The obtained results are shown in Table 3.

From the results of Table 3, it is understood that the oil resistance, the water resistance and the dispersion stability of Examples 1-4 are all good, whereas in Comparative Examples 1 and 2, the water resistance is poor, and in Comparative Examples 2 and 3, the dispersion stability is poor.

Example 5

Evaluation in the Internal Application Process

An aqueous dispersion (875 g) containing a 0.5 wt % mixture of 40 parts of a beaten LBKP (Leaf Bleached Kraft Pulp) and 60 parts of a beaten NBKP (Needle Bleached Kraft Pulp) having a freeness of 450 ml (Canadian Standard Freeness) was introduced under stirring into the flask, then, 3.06 g of an aqueous solution containing 1 wt % of the cationic starch (SB GUM-POSIT300 produced by SANGUAN WONGSE IND. CO., LTD) was added and the stirring was continued for 1 minuets, then 1.31 g of an aqueous solution containing 1 wt % of polyamidoamine-epichlorohydrin (WS-4020 produced by Japan PMC Co., Ltd., a paper strengthening agent in wet condition) was added and the stirring was continued for 1 minuets, then 1.31 g of the diluted aqueous dispersion (SD1) containing 1 wt % of the fluorine-containing copolymer was added and the stirring was continued for 1 minuets.

The resultant pulp slurry was made into paper with a standard hand papermaking machine described in JIS P8222 (The hand papermaking machine was modified to give a paper having a size of 25 cm×25 cm).

TABLE 3

(Evaluation results in the surface application process: Examples 1-4)

| | | | Exp. 1 | Exp. 2 | Exp. 3 | Exp. 4 |
|---|---|---|---|---|---|---|
| Fluorine-containing Copolymer Solution | Copolymer solution No. | | S1 | S2 | S3 | S4 |
| | Monomer comp. (parts by weight) | C6FA | 77 | 77 | 74 | 77 |
| | | HEMA | 13 | 13 | 16 | 13 |
| | | AE-200 | 5 | 5 | 5 | 5 |
| | | MAA | 5 | 5 | 5 | — |
| | | IA | — | — | — | 5 |
| | Chain transfer agent (L-SH) (parts by weight) | | 0 | 0.1 | 0 | 0 |
| | Molecular weight of copolymer | Mw | 500,000 | 150,000 | 500,000 | 180,000 |
| Aqueous Dispersion | Aqueous dispersion No. | | SD1 | SD2 | SD3 | SD4 |
| | Oil resistance: Kit value | | 8 | 8 | 8 | 7 |
| | Water resistance: Cobb value (g/m$^2$) | | 25 | 25 | 25 | 27 |
| | Dispersion stability | | Good | Good | Good | Good |

(Evaluation results in the surface application process: Comparative Examples 1-3)

| | | | Comp. Exp. 1 | Comp. Exp. 2 | Comp. Exp. 3 |
|---|---|---|---|---|---|
| Fluorine-containing Copolymer Solution | Copolymer solution No. | | R1 | R2 | R3 |
| | Monomer comp. (parts by weight) | C6FA | 77 | 77 | 77 |
| | | HEMA | 13 | 13 | 13 |
| | | AE-200 | 5 | 5 | 5 |
| | | MAA | 5 | 5 | — |
| | | IA | — | — | 5 |
| | Chain transfer agent (L-SH) (parts by weight) | | 0.3 | 1 | 0.1 |
| | Molecular weight of copolymer | Mw | 50,000 | 10,000 | 45,000 |
| Aqueous Dispersion | Aqueous dispersion No. | | RD1 | RD2 | RD3 |
| | Oil resistance: Kit value | | 8 | 9 | 9 |
| | Water resistance: Cobb value (g/m$^2$) | | 50 | 76 | 25 |
| | Dispersion stability | | Good | Poor | Poor |

The resultant wet paper was pressed between filter paper sheets under a pressure of 3.5 kg/cm² so as to sufficiently absorb water contained in the paper. The paper was dried over a drum drier (115° C.×70 seconds) to obtain a water and oil resistant paper.

The basis weight of the resultant paper was 70 g/m². The water resistance (Cobb value) of this hand sheet paper was 100 g/m² or more, and the oil resistance (Kit value) was 0, and the oil resistance (AGR) was 100.

Examples 6 and 7

Evaluation in the Internal Application Process

The same procedures in Example 5 were carried out except that the aqueous dispersions (SD2 and SD3) containing the fluorine-containing copolymer were used instead of the aqueous dispersion (SD1) containing the fluorine-containing copolymer in the Example 5. The water resistance and the oil resistance of the obtained water and oil resistant papers were evaluated, and these results are shown in Table 4.

Comparative Examples 4-6

Evaluation in the Internal Application Process

The same procedures as in Example 5 were carried out except that the aqueous dispersions (RD1-RD3) containing the fluorine-containing copolymer were used instead of the aqueous dispersion (SD1) containing the fluorine-containing copolymer in Example 5. The water resistance and the oil resistance of the obtained water and oil resistant papers were evaluated, and these results are shown in Table 4.

TABLE 4

|  |  |  | Exp. 5 | Exp. 6 | Exp. 7 |
|---|---|---|---|---|---|
| Fluorine-containing Copolymer Solution | Copolymer solution No. |  | S1 | S2 | S3 |
|  | Monomer comp. (parts by weight) | C6FA | 77 | 77 | 74 |
|  |  | HEMA | 13 | 13 | 16 |
|  |  | AE-200 | 5 | 5 | 5 |
|  |  | MAA | 5 | 5 | 5 |
|  |  | IA | — | — | — |
|  | Chain transfer agent (L-SH) (parts by weight) |  | 0 | 0.1 | 0 |
|  | Molecular weight of copolymer | Mw | 500,000 | 150,000 | 500,000 |
| Aqueous Dispersion | Aqueous dispersion No. |  | SD1 | SD2 | SD3 |
|  | Oil resistance: Kit value |  | 8 | 8 | 8 |
|  | Oil resistance: AGR value |  | 10 | 8 | 10 |
|  | Water resistance: Cobb value (g/m²) |  | 25 | 25 | 25 |
|  | Dispersion stability |  | Good | Good | Good |

(Evaluation results in the Internal application process: Comparative Examples 4-6)

|  |  |  | Comp. Exp. 4 | Comp. Exp. 5 | Comp. Exp. 6 |
|---|---|---|---|---|---|
| Fluorine-containing Copolymer Solution | Copolymer solution No. |  | R1 | R2 | R3 |
|  | Monomer comp. (parts by weight) | C6FA | 77 | 77 | 77 |
|  |  | HEMA | 13 | 13 | 13 |
|  |  | AE-200 | 5 | 5 | 5 |
|  |  | MAA | 5 | 5 | — |
|  |  | IA | — | — | 5 |
|  | Chain transfer agent (L-SH) (parts by weight) |  | 0.3 | 1 | 0.1 |
|  | Molecular weight of copolymer | Mw | 50,000 | 10,000 | 45,000 |
| Aqueous Dispersion | Aqueous dispersion No. |  | RD1 | RD2 | RD3 |
|  | Oil resistance: Kit value |  | 8 | 9 | 9 |
|  | Oil resistance: AGR value |  | 10 | 15 | 35 |
|  | Water resistance: Cobb value (g/m²) |  | 50 | 76 | 25 |
|  | Dispersion stability |  | Good | Poor | Poor |

From the results of Table 4, it is understood that the oil resistance, the water resistance and the dispersion stability of Examples 5-7 are all good, whereas in Comparative Examples 4 and 5, the water resistance is poor, and in the comparative Examples 5 and 6, the dispersion stability is poor.

The invention claimed is:

1. A water and oil resistant agent for paper comprising a fluorine-containing copolymer comprising the repeating units derived from:
   (a) a fluorine-containing monomer having a fluoroalkyl group represented by the general formula:

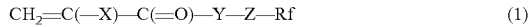

$$CH_2=C(-X)-C(=O)-Y-Z-Rf \qquad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$-$C_{21}$ fluoroalkyl group, a substituted or non-substituted benzyl group, or a substituted or non-substituted phenyl group;
   Y is —O— or —NH—;
   Z is a $C_1$-$C_{10}$ aliphatic group, a $C_6$-$C_{10}$ aromatic or cyclic aliphatic group, a
   —$CH_2CH_2N(R^1)SO_2$— group wherein $R^1$ is a $C_1$-$C_4$ alkyl group,
   a —$CH_2CH(OZ^1)CH_2$— group wherein $Z^1$ is a hydrogen atom or an acetyl group),
   a —$(CH_2)_m$—$SO_2$—$(CH_2)_n$— group or a —$(CH_2)_m$—S—$(CH_2)_n$— group wherein m is 1-10 and n is 0-10, and
   Rf is a $C_4$-$C_6$ linear or branched fluoroalkyl group,
   (b) a hydrophilic monomer which comprises ω-hydroxy-polyoxyethylene (meth)acrylate (b1) and 2-hydroxyethyl (meth)acrylate (b2), and
   (c) a monomer having an anion-donating group wherein the anion-donating group is a carboxylic acid group or a sulfonic acid group,
   wherein a weight average molecular weight of the fluorine-containing copolymer is 100,000 to 3,000,000, and
   wherein the weight ratio of (a):(b):(c) is 60-85:5-35:1-15.

2. The water and oil resistant agent for paper claimed in claim 1, wherein the fluoroalkyl group (Rf group) in the monomer (a) is a perfluoroalkyl group.

3. The water and oil resistant agent for paper claimed in claim 1, wherein the monomer (b1) is at least one oxyethylene (meth)acrylate represented by the general formula:

$$CH_2=CX^1C(=O)-O-(RO)_n-X^2 \qquad (2a)$$

wherein $X^1$ is a hydrogen atom or a methyl group;
   $X^2$ is a hydrogen atom;
   R is a an ethylene group; and
   n is an integer of 2-90.

4. The water and oil resistant agent for paper claimed in claim 1, wherein the monomer (c) is a compound having an anion-donating group and a carbon-carbon double bond.

5. The water and oil resistant agent for paper claimed in claim 1, wherein the monomer (c) is at least one selected from the group consisting of (meth)acrylic acid, crotonic acid, maleic acid, fumaric acid, itaconic acid, citraconic acid, vinylsulfonic acid, (meth)allylsulfonic acid, styrene sulfonic acid, vinylbenzene sulfonic acid, acrylamide-tert-butylsulfonic acid, and salts thereof.

6. The water and oil resistant agent for paper claimed in claim 1, wherein the amount of the monomer (a) is 40-90 wt %, the amount of the monomer (b) is 2-50 wt % and the amount of the monomer (c) is 0.1-30 wt % based on the fluorine-containing polymer.

7. The water and oil resistant agent for paper claimed in claim 1, wherein the weight average molecular weight of the fluorine-containing copolymer is 120,000 to 2,000,000.

8. The water and oil resistant agent for paper claimed in claim 1, wherein the monomer (c) is at least one selected from the group consisting of (meth)acrylic acid, crotonic acid, maleic acid, fumaric acid, itaconic acid and citraconic acid.

9. The water and oil resistant agent for paper claimed in claim 1, wherein the monomer (a) is $F(CF_2)_4CH_2CH_2OCOCH=CH_2$, $F(CF_2)_6CH_2CH_2OCOCH=CH_2$ or a mixture thereof, and
   the monomer (c) is (meth)acrylic acid.

10. The water and oil resistant agent for paper claimed in claim 9, wherein the weight average molecular weight of the obtained fluorine-containing polymer is 120,000 to 2,000,000.

11. The water and oil resistant agent for paper claimed in claim 1, wherein the monomer (a) is $F(CF_2)_4CH_2CH_2OCOCH=CH_2$ or $F(CF_2)_6CH_2CH_2OCOCH=CH_2$ or the mixture thereof, and the monomer (c) is methacrylic acid.

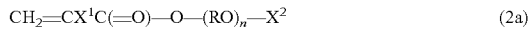

12. The water and oil resistant agent for paper claimed in claim 11, wherein the weight ratios of (a):(b1):(b2):(c) are 60-85:1-15:5-20:1-15, and the weight average molecular weight of the obtained fluorine-containing polymer is 120,000 to 2,000,000.

13. A process for a water and oil resistant treatment of a paper, wherein the process comprises a step of applying the water and oil resistant agent claimed in claim 1 to the surface of the paper.

14. The process claimed in claim 13, wherein the process uses the water and oil resistant agent in such amount that the weight ratio of the fluorine atoms is in the range of 0.005-0.6 wt % based on the weight of the paper.

15. The treated paper which is obtained by the process claimed in claim 13.

16. A process for the water and oil resistant treatment of a paper, wherein the process comprises a step of applying the water and oil resistant agent claimed in claim 1 to the whole paper including its internal parts.

17. The process claimed in claim 16, wherein the step of applying the water and oil resistant agent to the whole paper is a step of applying the water and oil resistant agent at a paper making stage with pulp.

18. The process claimed in claim 17, wherein the water and oil resistant agent is used in such amount that the weight ratio of the fluorine atoms is in the range of 0.01-1.0 wt % based on the weight of the pulp.

19. The treated paper which is obtained by the process claimed in claim 16.

20. A treated paper which is treated with the water and oil resistant agent claimed in claim 1.

21. The water and oil resistant agent for paper claimed in claim 1, wherein the weight average molecular weight of the fluorine-containing copolymer is 150,000 to 3,000,000.

* * * * *